US006447639B1

(12) United States Patent
Warren et al.

(10) Patent No.: US 6,447,639 B1
(45) Date of Patent: Sep. 10, 2002

(54) PROCESS FOR CONTROLLING A DIGESTER USING REAL TIME MEASUREMENT OF MOISTURE CONTENT AND SPECIES OF WOOD

(76) Inventors: Sita Ruby Warren, Fuller Hollow Rd., Vestal, NY (US) 13850; Douglas John McKenzie, 3319 Stephenson Point Road, Nanaimo, British Columbia (CA), V9T 1K3

( * ) Notice: Subject to any disclaimer, the term of this patent is extended or adjusted under 35 U.S.C. 154(b) by 0 days.

(21) Appl. No.: 09/797,608

(22) Filed: Mar. 5, 2001

(51) Int. Cl.$^7$ ................................................. D21C 7/12
(52) U.S. Cl. .............................. 162/49; 162/52; 162/68; 162/61; 162/62; 162/238; 162/DIG. 6; 250/282; 250/287; 422/3; 422/62; 422/108; 700/117; 700/127; 700/128
(58) Field of Search ........................... 162/49, 52, 198, 162/246, 263, 238, 262, 61, 62, DIG. 10; 436/153; 250/282, 287; 700/127, 128, 129, 117; 422/3, 62, 105, 108, 109, 110, 111

(56) References Cited

U.S. PATENT DOCUMENTS

| 4,990,219 A | * | 2/1991 | Beller et al. ................. 162/238 |
| 5,071,771 A | | 12/1991 | Barbour et al. ............. 436/153 |
| 5,547,546 A | * | 8/1996 | Prough et al. ............... 162/246 |
| 6,211,470 B1 | * | 4/2001 | Beran et al. ................. 162/198 |

OTHER PUBLICATIONS

A.H. Lawrence, Rapid Characterization of Wood Species by Ion Mobility Spectrometry, 75$^{th}$ Annual Meeting of Technical Section of Canadian Pulp and Paper Association, Feb. 2, 1989.

A.H. Lawrence, et al., Identification of Wood Species by Ion Mobility Spectrometry, Anal. Chem. 1991, 63, 1217–1221.
Roger C. Petterson, et al., Detection of Northern Red Oak Wetwood by Fast Heating and Ion Mobility Spectrometric Analysis, Holzforschung, 47 (1993) 513–522.
John R. Obst, Analytical Pyrolysis of Hardwood and Softwood Lignins and its Use in Lignin–Type Determination of Hardwood Vessel Elements, Forest Products Laboratory, Forest Service, U.S. Dept. of Agriculture, Madison, Wisconsin 53705.
A.J. Panshin & Carl de Zeeuw, Textbook of Wood Technology, 3$^{rd}$ ed., vol. 1, McGraw–Hill, New York, pp. 419–421.

* cited by examiner

Primary Examiner—Steve Alvo
(74) Attorney, Agent, or Firm—Oyen Wiggs Green & Mutala (57) ABSTRACT

An on-line pulp digester control system. More particularly, this invention pertains to a control system which employs real time measurements from ion mobility spectrometry to automatically rapidly and continuously determine the physical and chemical characteristics of wood chip feedstock being fed into a pulp digester and thereby maximize process efficiencies, minimize chemical and energy consumption and improve product uniformity. An intelligent control system which utilizes the moisture content and species of wood chips on-line in a pulping process comprising: (a) conveying wood chips from a wood chip storage facility to a digester; (b) scanning the wood chips as they are conveyed to determine their species and moisture content by heating the wood chips and sensing the moisture content and characterizing the species of the wood chips by species signatures obtained by an ion mobility spectrometer; and (c) regulating steam flow and chemicals supplied to the digester according to the moisture content and the characterization of the wood chip species.

13 Claims, 8 Drawing Sheets

FIG. 1

WHITE SPRUCE

FIG. 2a

LODGEPOLE PINE

BALSAM FIR

170% MC FROZEN (-15°C)

FIG. 4

PROCESS FOR CONTROLLING A DIGESTER USING REAL TIME MEASUREMENT OF MOISTURE CONTENT AND SPECIES OF WOOD

FIELD OF THE INVENTION

This invention relates to a novel intelligent on-line pulp digester control system. More particularly, this invention pertains to a novel intelligent control system which employs heat and ion mobility spectrometry to automatically, rapidly and continuously determine on-line in real time the physical and chemical characteristics of feedstock being fed into a pulp digester and thereby maximize process efficiencies and minimize chemical and energy consumption.

BACKGROUND OF THE INVENTION

Many pulp mills use a chemical pulping process for producing pulp from wood. In such a process, it is important that the physical and chemical characteristics of the wood chip feedstock that is fed into a pulp digester be taken into account in order to ensure consistent and optimal quality pulp production. The chemical pulping process includes a digester which is a vessel that utilizes steam and chemicals in the form of "liquor" to "cook" the wood chips under pressure and break them down to cellulose and hemi-cellulose fibres. Currently, there is no accurate or feasible way to measure the physical and chemical characteristics of the wood chip feedstock, including moisture and wood species type, continuously and on-line. The physical and chemical characteristics of the wood chip feedstock must be estimated according to empirical formulae.

The moisture content of the wood chips feeding a digester depend on such factors as their source (residual chips or whole log chipping), the wood species involved, the retention time of the wood chips on the wood chip piles and the time of year. These variables often result in wood chip moisture deviations of between 5 and 10 percent, which is significant for pulp production purposes. The practice is to err on the conservative side in estimating moisture levels.

The nature of wood species in the wood chips also is important because it too affects the "cooking" process. Certain species of wood chips require higher levels of alkali chemicals to digest the chips and break them down into cellulose and hemi-cellulose fibres. Because of these significant variables and the inability with current instrumentation to continuously monitor chip moisture content and wood species type on-line, operators of pulp mills tend to run higher than required liquor to wood ratios in the digester in order to ensure consistent quality and that the produced pulp will meet required specifications. The downside of running elevated liquor to wood ratios and active alkali charges, however, is that more than necessary levels of chemicals and high levels of steam are required to heat the liquor, which in turn increases energy costs. Running less than conservative liquor to wood chip ratios and active alkali charges runs the risk of reducing wood pulp quality due to loss of circulation and the occurrence of dirty or uncooked blows. On balance, to ensure high quality pulp, it is preferred to follow a conservative approach and run at higher ratios, which are more costly.

Apart from the handicap of having to operate the digester empirically under conservative parameters which raise energy and processing chemical costs, there is an inherent shortcoming with current testing procedures. Currently, there is no instrumentation or methodology available which can rapidly monitor wood chip feedstocks on-line and determine wood species and moisture content. The common procedure to determine wood species is to run tests on the pulp that is produced by the digester to determine if the pulp meets specifications for a specific grade type. This is known as a "feedback" testing approach. The problem with this approach is that in many cases approximately three hours of pulp production are jeopardized if the resultant pulp quality is not up to specifications. If the pulp does not meet specifications, it must be downgraded to a lower grade which attracts a lower price.

It would be highly advantageous if lower amounts of chemicals and less liquor were used in a digester cook, so that less steam would be required to heat the liquor to cooking temperature. Typically, if this could be done, it is conservatively estimated that liquor to wood ratios would be reduced by a minimum of 6 percent on hemlock or Douglas fir wood chips, and by 11 percent on western red cedar wood chips. This would result in a reduction in energy consumption per cook of approximately 4 to 5 percent on hemlock or Douglas fir wood chips and of about 8 percent on western red cedar. Benefits will be mill specific and dependent upon the wood species they cook, the moisture content of their chips and their current cooking strategy.

For the foregoing reasons, it would be extremely advantageous if a continuous rapid "feed-forward" on-line testing procedure were available so that wood chip species and moisture content could be continuously monitored on-line. This information would facilitate improved chip species control, active alkali charge and liquor to wood ratio control and would ensure consistent production of pulp to specified standards. In addition, to the economic benefits of improved control, the environmental impact of the process would be reduced.

In recent years, pulp mill owners have become increasingly aware of the importance of accurately determining the wood species of the feedstock. Previously, it was common practice, particularly in northwestern North America, to mix different wood species together. However, different wood species have different wood fibre properties. For example, Douglas fir has coarse, stiff fibres which, when pulped, forms an open, free-draining pulp mat with very high tear strength. Western red cedar, on the other hand, has flexible flat fibres which, when pulped, yields a closely grouped fibre mass which drains very slowly but has excellent tensile strength properties. Certain pulps are made from a mixture of western hemlock and balsam feedstock. The properties of these blends fall between those of Douglas fir and western red cedar. In recent years, purchasers have become increasingly demanding in asking for specific quality pulps made from specific wood species. It is therefore important for pulp producers to be able to control the wood fibre type. This is done by segregating wood species and controlling the species of wood in the feedstock. The benefits of segregating wood chips according to their species applies equally to both hardwoods and softwoods.

For the foregoing reasons, there is a strong and long felt need for a quick and accurate intelligent feed forward control system for determining moisture content and wood species of wood chips on-line as the wood chips are fed via a conveyor from a wood chip source to a digester to ensure consistent, optimum quality pulp production with minimum energy and chemical consumption. Real time measurement of the physical and chemical characteristics of the wood chip feedstock (moisture content and species) would enable the minimization of chemical and energy requirements.

Ion mobility spectrometry (IMS) is relatively recently developed technology that is capable of separating ionized compounds based on differences in their drift velocity through a gas under an applied electric field. This IMS technique has the ability to produce, in a matter of milliseconds, a characteristic spectrum of a specific series of high molecular weight compounds. It is known, for instance, that IMS can produce identifiable signatures for such items as narcotics and explosives and hence it is being developed for use by customs, airlines and police forces to detect such substances.

Initial tests have been carried out to determine if IMS can be used to identify different bulk wood species, such as lumber, on a static basis. A report on these tests, entitled "Rapid Characterization of Wood Species by Ion Mobility Spectrometry", was published by A. H. Lawrence on Feb. 2, 1989 at the 75th Annual Meeting of the Technical Section of the Canadian Pulp and Paper Association. Some tests were carried out in the "positive mode" and some in the "negative mode". Positive mode is when polarity of the electric field is positive, i.e. positive ions are present in the detection mode. Negative mode is when the polarity of the electric field is negative, i.e. negative ions are present in the detection mode. The initial static tests demonstrated that it was possible to distinguish some wood species from other wood species provided the tests were conducted in both modes. However, a number of variable parameters occurred that initially appeared to make the IMS technology unacceptable for use in the lumber industry. First of all, sampling and analyzing the wood species by an IMS device took several seconds which made it unsuitable for fast moving conveyors used in saw mills. Secondly, it seemed that only certain types of wood species could be identified. Thirdly, it was not clear how the IMS device would work in a typical saw mill environment where obscuring contaminants such as sawdust, other types of particles, and vapors from both machinery and wood were present.

U.S. Pat. No. 5,071,771, Barbour et al., granted Dec. 10, 1991, discloses a method and apparatus for assessing a wood sample and producing an ion mobility signature representing the wood sample. Respective signatures can be compared to identify the specific wood species. The method involves producing an ion drift time signature for a specific wood species. The method comprises heating at least a portion of the wood sample to a temperature in the range of about 220° to 350° C. This desorbs and produces trace vapors from the wood sample. The vapors are ionized at a temperature in the range of about 220° to 350° C. The ions are pulsed through a gate into a drift region. The time of arrival of the ions and the ion flux for each pulse are measured with a collector electrode which is located at the end of the drift region. This produces an ionic signal which is amplified. The signal is averaged to provide an ion drift time signature for the specific wood sample.

SUMMARY OF INVENTION

The present invention is to be able to analyze representative wood chip samples for moisture content and species type on-line within a very short space of time on a conveyor belt delivering the wood chips to a digester. The subject invention provides a method of optimizing chemical and energy usage required in a pulping process by producing on-line in the pulping process an ion drift time signature representing a wood chip species and moisture content, comprising the steps of rapidly heating representative wood chips with a laser, such as a carbon dioxide laser, to a temperature in the range of about 220° to 350° C., and utilizing an ion mobility spectrometer.

The invention is directed to a process of utilizing accurate, real time measurements of the moisture content and species of wood chips on-line in a pulping control process comprising: (a) conveying wood chips from a wood chip storage facility to a digester; (b) scanning the wood chips as they are conveyed to determine their species and moisture content by heating the wood chips and sensing the moisture content and characterizing the species of the wood chips by species signatures obtained by an ion mobility spectrometer; and (c) regulating steam flow and chemicals supplied to the digester according to the moisture content and the characterization of the wood chip species.

The rate of conveyance of the wood chips from the storage facility to the digester can be controlled by a wood chip rate control mechanism. The wood chip storage facilities discharge devices can be regulated according to the characterization of the wood chip species. The wood chips can be heated with a laser beam. Representative samples of wood chips can be periodically removed from the wood chips being conveyed to the digester for analysis by the ion mobility spectrometer. Removal can be done with a robotic arm at a transfer point. The data from the ion mobility spectrometer can be transmitted to a programmed microprocessor in a distributed control system which can continuously control rate of steam and chemical supply to the digester to minimize steam and chemical use and optimize digestion time of the wood chips.

The invention in another embodiment is directed to a process of utilizing accurate and real time measurements of the moisture content and species of wood chips in an on-line pulping control process comprising: (a) conveying wood chips from a wood chip storage facility to a digester; (b) controlling the rate of flow of the wood chips with a wood chip rate control mechanism; (c) sampling the wood chips at an optimum transfer point using a robotic arm or continuously monitoring wood chips on the conveyor belt; (d) scanning the wood chips provided by the robotic sampler to determine their species and moisture content by heating the wood chips and sensing the moisture content and characterizing the species of the wood chips by species signatures obtained by an ion mobility spectrometer; and (e) regulating steam flow and chemicals supplied to the digester according to the characterization of the wood chip species.

The distributed control system of the invention can continuously monitor and adjust process targets to optimize wood species control. Optimal chip sampling sites can be determined for utilizing the moisture content and species data obtained by the ion mobility spectrometer in real time mode. The data obtained from the ion mobility spectrometer can be transmitted to a control system which can adjust wood chip reclaim speed to regulate chip species control. Wet wood mass flow rate can be determined by an on-line chip weightometer or from the digester fill weights or chip meter RPM.

The invention in a further embodiment is also directed to a process of characterizing moisture and species of wood chips in real time in a pulp mill wood chip feedstock and continuously controlling feedstock rate, and chemical and steam consumption by removing a representative wood chip sample from the feedstock, heating the wood chip sample with a laser to produce trace vapours from the wood chip sample, ionizing the trace vapours, measuring the time of arrival of the ionized vapours at a collector electrode, producing an electrical data signal signature representative of the moisture and wood chip species in the feedstock, transmitting the electrical data signal to a distributed control system which regulates a wood chip silo variable frequency drive according to a predetermined set point, regulates liquor to wood ratio according to a second predetermined set point, and regulated active alkali to dry wood ratio according to a third predetermined set point.

It is understood that the principles of this invention can be applied to pulping processes that utilize non-wood sources such as bagasse, reeds, straw and other fibre sources.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

The inventors have been endeavoring for a number of years to develop an on-line system for quickly and accurately determining wood species and moisture content of wood chip feedstock for a digester. Moisture detectors have been tested but despite concerted efforts, they have been found to be too inaccurate and unreliable and hence impractical for use in on-line conditions. Optical scanning systems with lasers have also been tested but have been found to be unsuitable and impractical because of low and unreliable accuracy levels.

We have now invented an intelligent control system which minimizes the chemical and energy requirements of the digester process by using real time moisture and species information derived by ion mobility sensor technology. The subject invention is capable of measuring on-line in a continuous pattern the moisture and species characteristics of the wood chip feedstock that is fed into a pulping digester that breaks down the wood chips to cellulose and hemicellulose fibres. Being able to monitor on-line critical characteristics of the wood chip feedstock, including accurate moisture levels and wood species according to the invention, and embodying it in an intelligent control system, enables unprecedented control of the digestion process and thereby reduces chemical and energy consumption and optimizes cooking duration.

Figure 1:
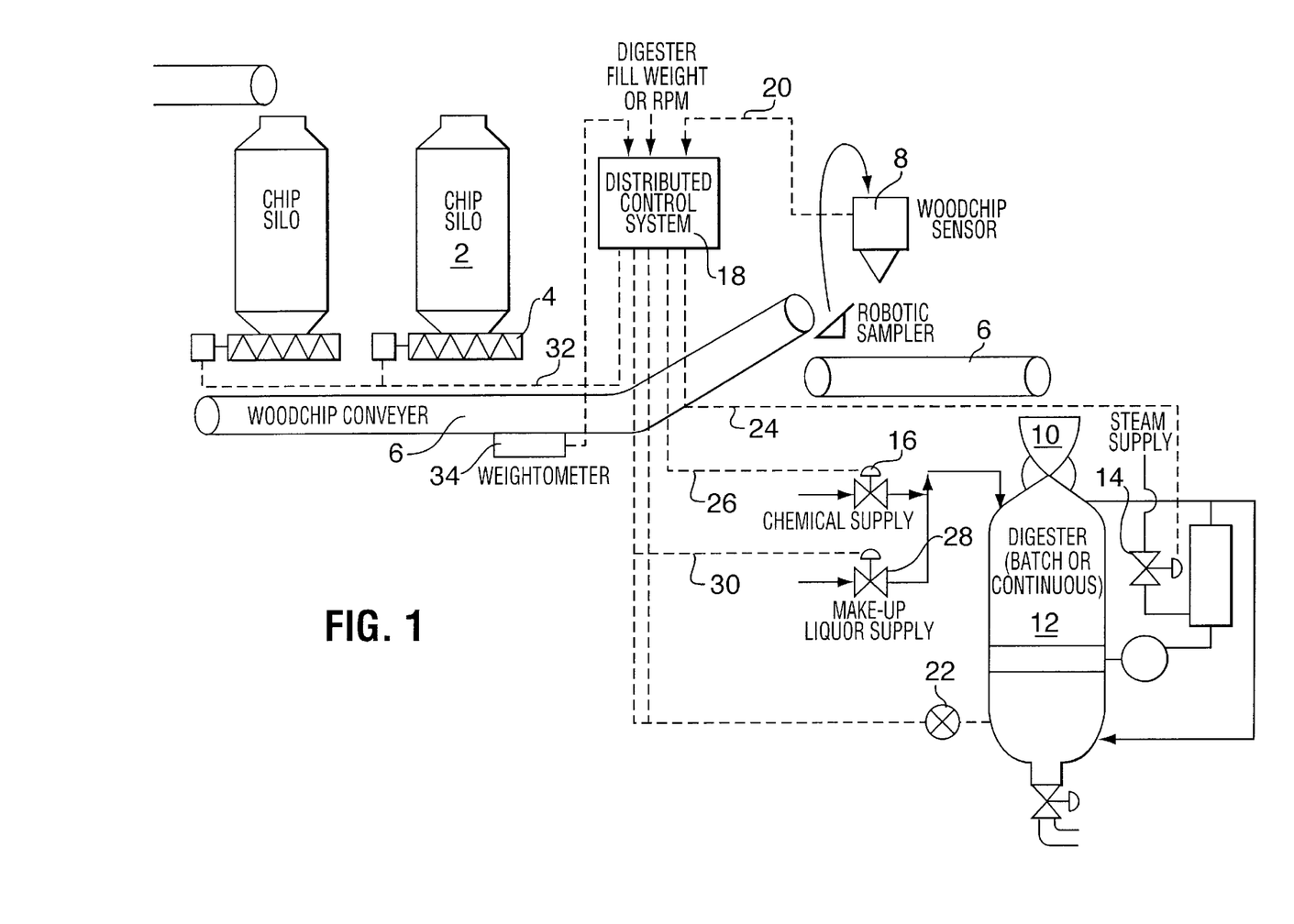
FIG. 1 illustrates a schematic flow sheet illustrating an on-line pulping system whereby wood chips are dispensed from a wood chip silo onto a wood chip conveyor, the moisture content and the wood species type are measured by an ion mobility spectrometer and the wood chips are then delivered to a wood pulp digester along with controlled steam and chemicals.

The following discussion refers to FIG. 1, which illustrates a schematic flow sheet of an on-line pulping system whereby wood chips are dispensed from one or more wood chip silos onto a wood chip conveyor. The moisture content and wood species type are assessed by an ion mobility spectrometer and the wood chips are delivered to a wood pulp digester along with controlled steam and chemicals. The pulping process consists of the selective delignification of wood chips using alkali chemicals, temperature and pressure. The digester process may be either batch or continuous. Wood chips and a specified amount of cooking chemicals (white and black liquor) are fed into a digester 12 where they are held and cooked for specified amount of time. The digestion time required varies according to the cooking chemicals charged as well as the temperature of the cook. The species of the wood being cooked also impacts on the time, temperature and chemical requirements of the cook. Once the desired amount of delignification has taken place, thereby releasing the pulp fibres, the contents of the digester 12 are discharged. The delignified wood chips are broken down into individual fibres which are then further processed into pulp.

While on the conveyor, representative wood chip samples are removed from the feedstock on a periodic basis, for example, less than a minute, and quickly analyzed by ion mobility spectrometry to determine the moisture content and the wood species type. After testing, the wood chip samples are returned to the conveyor. As seen in FIG. 1, the wood chip feedstock is conveyed to the digester 12 by a conveyor 6 from a hopper 2 or other storage facility. Two or more hoppers can be used if desired. (FIG. 1 illustrates two silos.) One silo can hold one species of wood chip while the second silo can hold a second species of wood chip. The rate of chip supply and total quantity is controlled by a wood chip dispenser 4, for example, an auger feeder and weighed by a weightometer 34. As the wood chips are transported on the conveyor 6, the composition (species, heartwood vs. sapwood, and moisture content) of periodic representative samples withdrawn by a robotic sampler is scanned by an IMS wood chip sensor 8. The characteristics are transmitted along line 20 to the control system 18. Specific control algorithms according to the invention interpret and use this sensed data, plus data from other sensors (e.g. an RTD 22 to measure digester temperature) via line 24 to steam control 14, to control steam flow to the digester 12, via line 26 to chemical supply control 16, to regulate chemicals supply to the digester 12 and via line 30 to make-up liquor supply control 28 to the digester 12. The data processed by the distributed control system 18 is also used to control via line 32 the speeds of the wood chip dispenser 4. The IMS sensor characterization from the periodic samples of the wood chip properties, including moisture levels and species type, enables fine real time on-line feed forward and feedback regulation and optimization of the process to ensure full digestion in a minimum of time with a minimum consumption of steam and chemicals.

An ion mobility spectrometer (IMS) suitable for use in the applicant's invention can be obtained from Barringer Research Limited. However, other types of ion mobility sensors are available from sources such as Bruker Daltonik GmbH, Bruker Daltonics, FemtoScan Corp., Graseby Dynamics, IDS Intelligent Detection Systems, and Ion Track Instruments.

This method of controlling the chip digestion process according to the invention can use several sensors, but the preferred implementation is with a single sensor. To the inventors knowledge, no single sensor, other than an IMS sensor, can fully characterize wood chip species and moisture control in one step on-line. However, multiple sensors or other single sensor technologies may be employed without affecting the general principle of the invention.

Unique features according to the invention include the real time determination of wood chip characteristics from wood chip samples taken continuously on-line or at intervals and the use of this data to optimize the "cooking process". The use of a single sensor to detect multiple feedstock characteristics is novel as applied to wood chips, as is the use of ion mobility spectrometry (IMS) in an on-line pulping process.

Figure 2A:
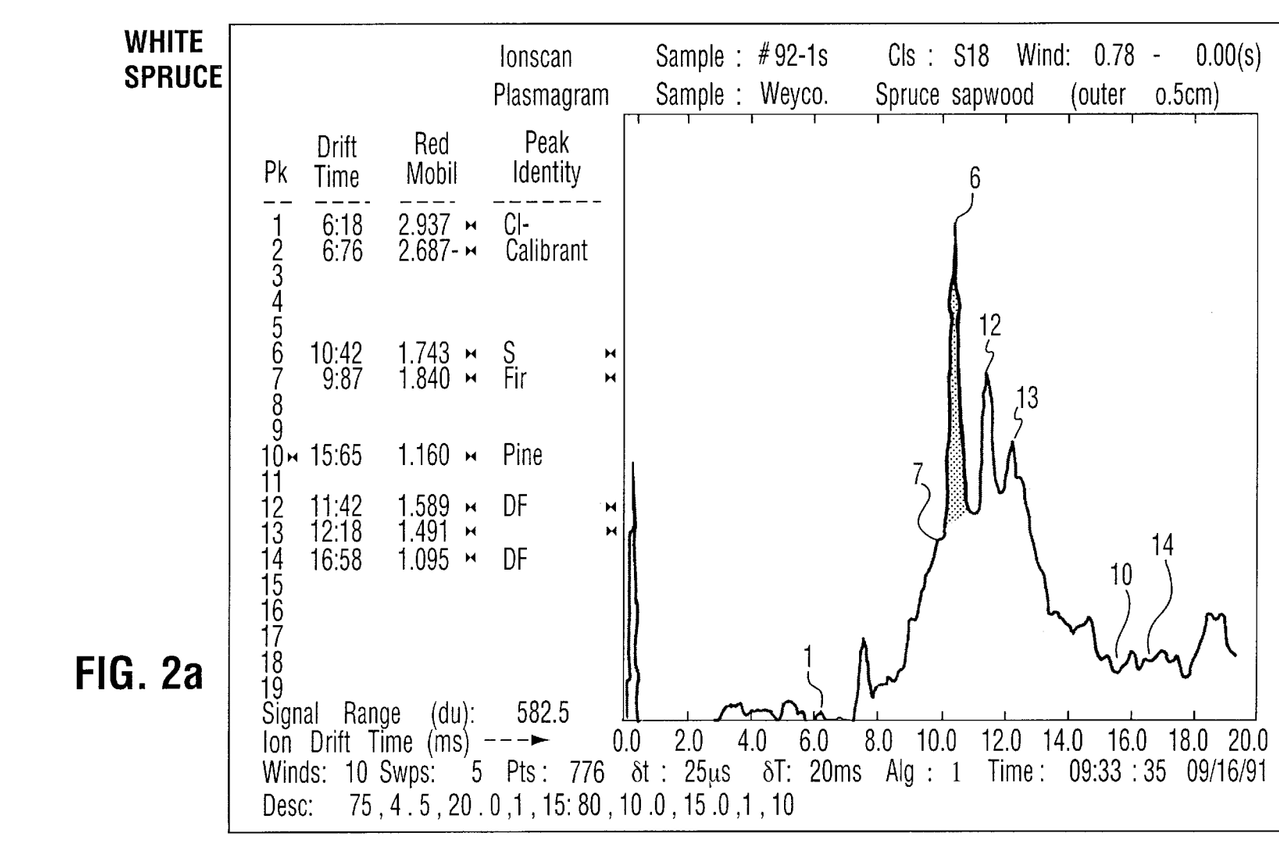
FIG. 2 illustrates three characteristic IMS species signatures derived from sapwood of white spruce, lodgepole pine and alpine fir.
Figure 2B:
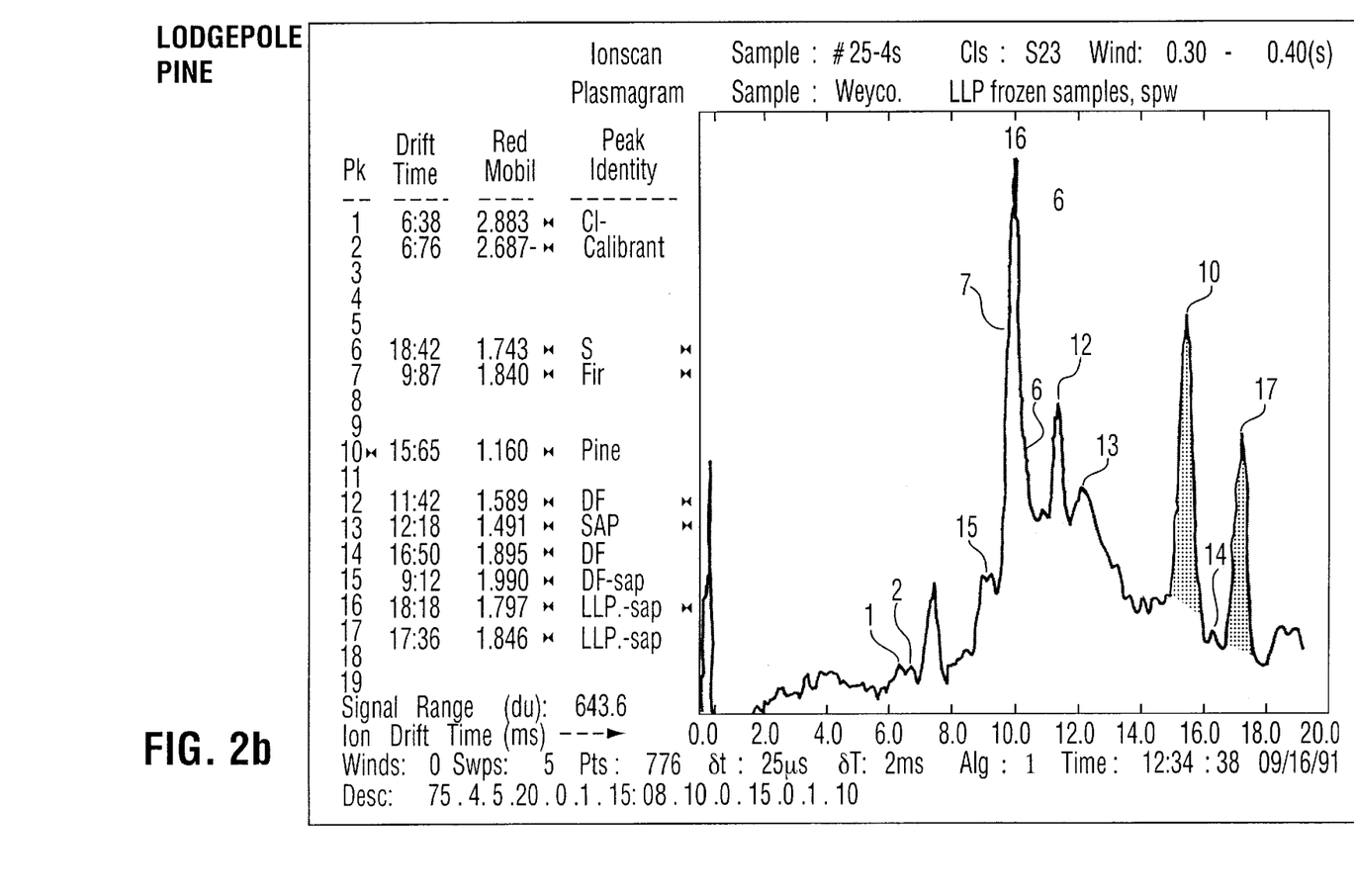
Figure 2C:
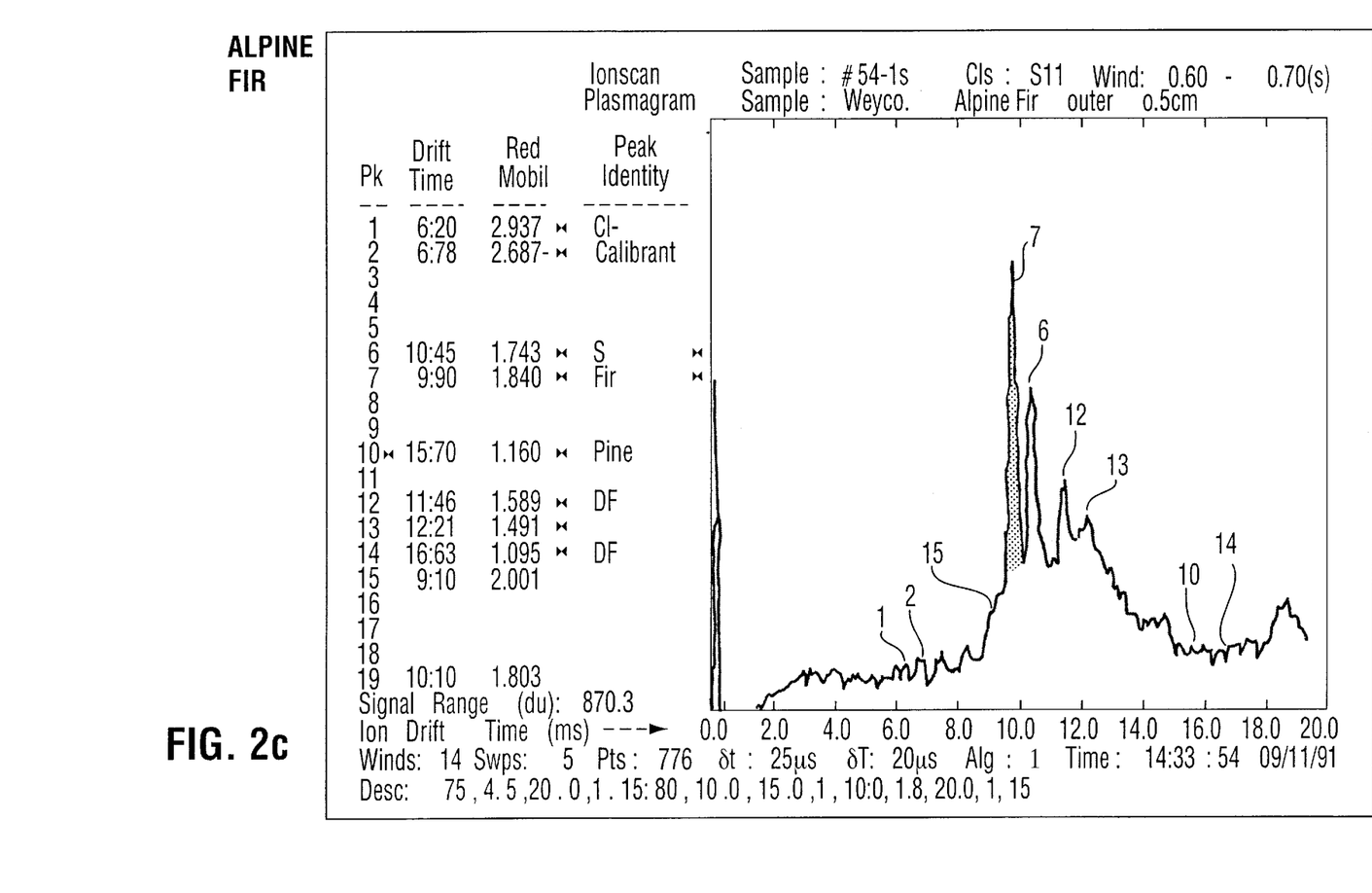
Figure 3A:
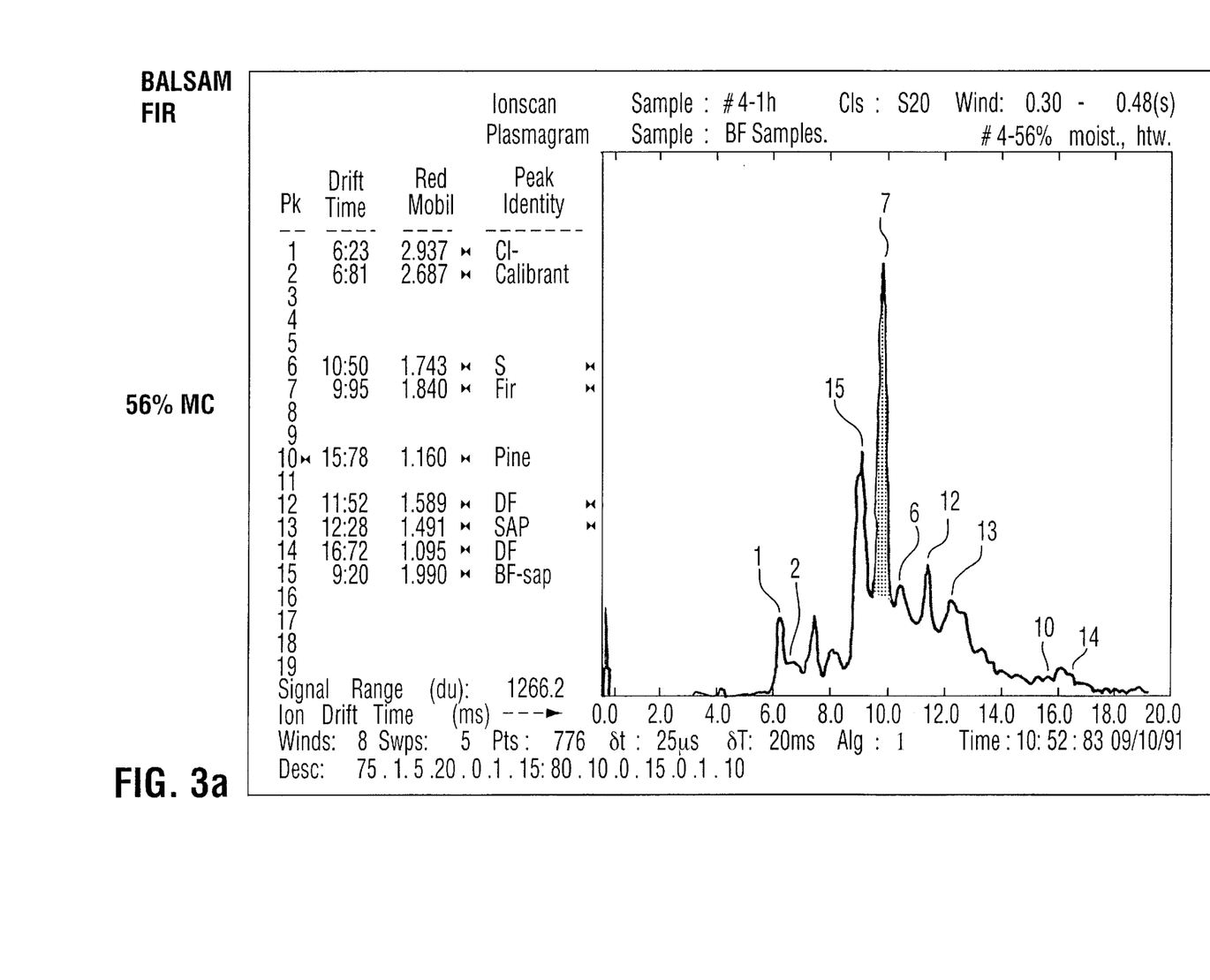
FIG. 3 illustrates characteristic IMS signatures of balsam fir under different moisture contents of 66 percent MC, 108 percent MC and 170 percent MC.
Figure 3B:
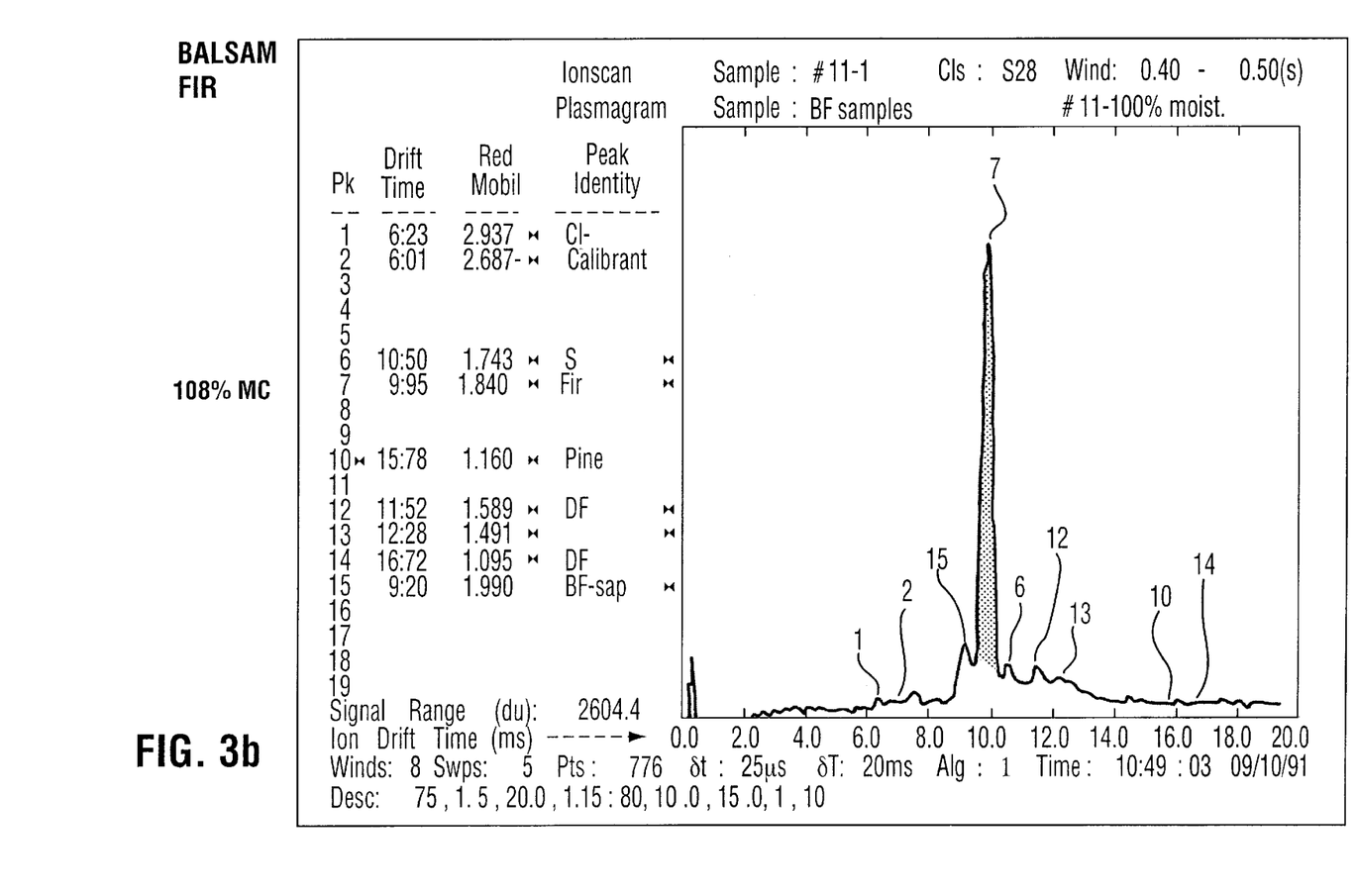
Figure 3C:
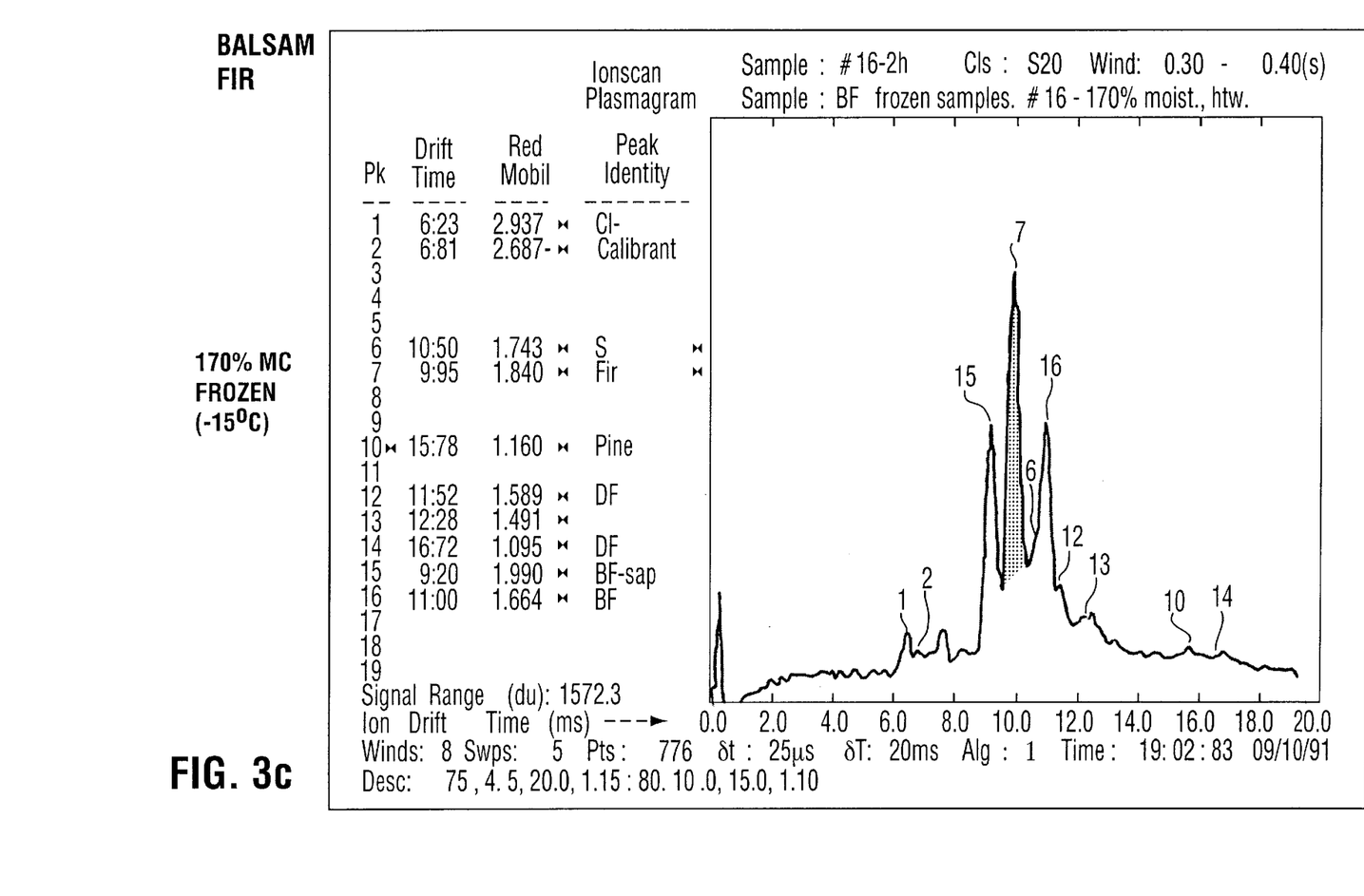

FIG. 2 illustrates characteristic species signatures derived from sapwood for white spruce, lodgepole pine and alpine fir. FIG. 3 illustrates characteristic signatures of balsam fir under different moisture contents of 66 percent MC, 108 percent MC and 170 percent MC. It will be noted that the species signatures for white spruce, lodgepole pine, alpine fir and balsam are quite different and distinctive. Thus, the species of the wood chips can be readily and rapidly determined using the ion mobility sensor techniques according to the invention.

Figure 4:
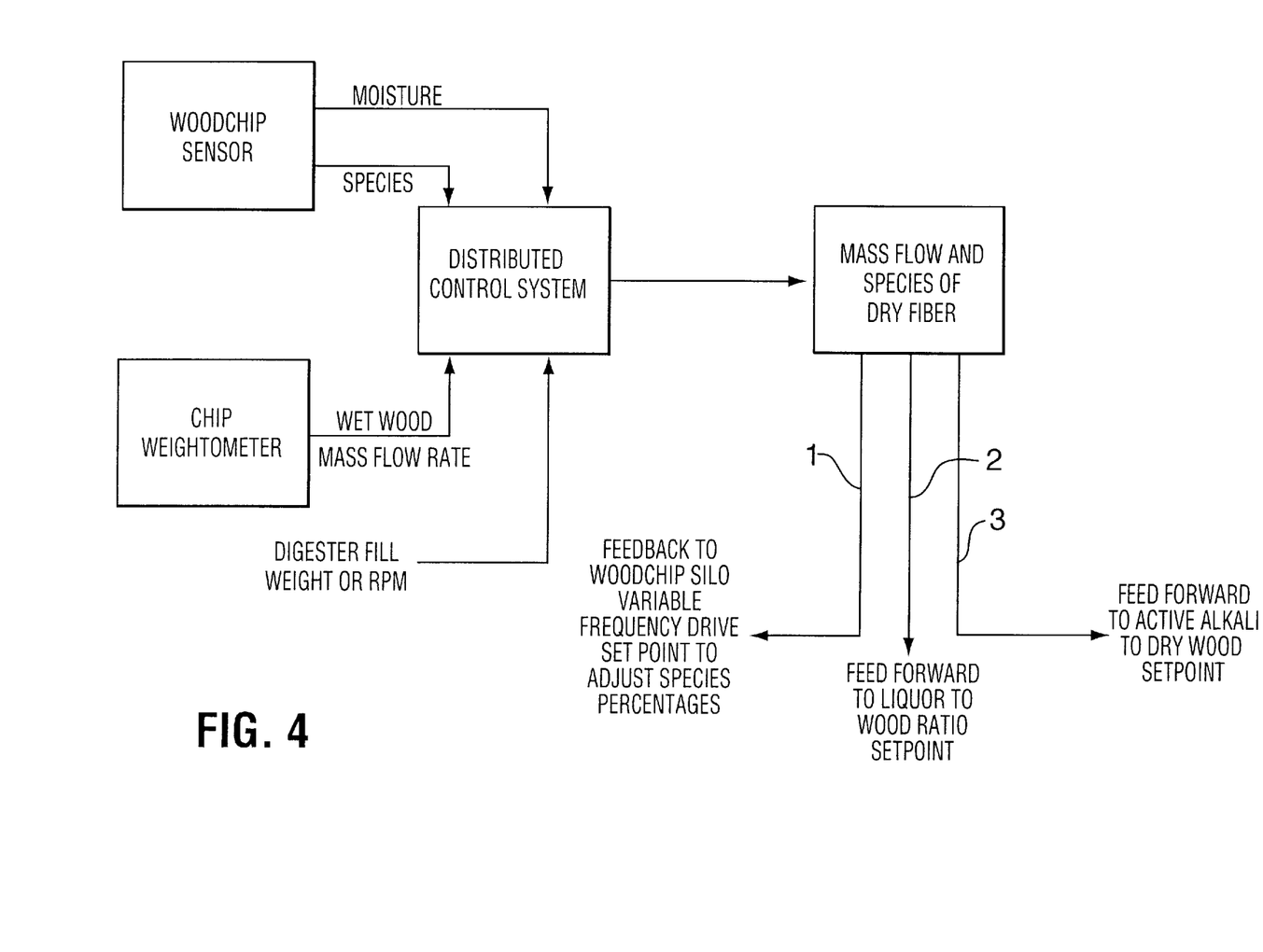
FIG. 4 illustrates a schematic of the sensors and control system and how they cooperate together according to the computer program.

FIG. 4 illustrates a schematic of the sensors and control system of the invention. The wood chip sensor determines moisture and species of a representative wood chip sample and transmits this data to the distributed control system. The chip weightometer weighs the feedstock and transmits the wet wood mass flow rate to the distributed control system. The digester fill weight or RPM data is also transmitted to the distributed control system. The algorithms of the distributed control system interpret this collected data and use it to regulate mass flow and species of dry fibre via (1) a feedback line to a wood chip silo(s) variable frequency drive set point to adjust wood species percentages, (2) a feed forward line to a liquor to wood ratio set point to control liquor input, and (3) via a feed forward line to an active alkali to dry wood set point to control chemical input. In this way, moisture and wood species is analyzed on-line, and the liquor to wood ratios, active alkali charge and steam consumption for the process are optimized on a continuous basis.

EXAMPLE

Using an ion mobility spectrometer purchased from Barringer Research Limited, representative wood chip samples were tested by heating the wood chips with a carbon dioxide laser to a preferred temperature range to produce trace vapors from the wood chips. The trace vapors were ionized at a further preferred temperature range. When this was done, it was determined that it was possible to measure the time of arrival of the ions and the ion flux at a collector electrode and produce a weak electric current signal representing an ionic signal. The signal was amplified and averaged to provide an ion drift time signature for the particular wood chip sample being tested. Measurements were made in the negative mode and the positive mode. Different signals were produced in the two modes. Mobility of a specific ion was dependent, at least partly, on the mass and shape of the ion, as well as the charge distribution. Mobilities were influenced by the media through which the ions travel, and by gas density variations which in turn depend on gas temperature and pressures. The density variations were normalized by reducing the mobility to a standard temperature and pressure and thus producing a reduced ion mobility signature derived from the ion drift time signature for the particular wood species sample being characterized. It was also found that these different signatures could be used to identify most wood chip species on-line, regardless of the fact that the temperature, and pressure conditions varied for different locations. The. signatures were identifiable regardless of the moisture content of the wood chips, and regardless of environmental conditions. Heartwood and sapwood signatures for the same wood chip species were different, but were specific for the specific wood chip species. By integrating this IMS data using a distributed control system algorithm according to the invention, and appropriate sensors and controls, continuous feed forward control of the chemical input and steam input in the on-line pulping process can be achieved.

Throughout the foregoing description, specific details have been set forth in connection with wood pulping in order to provide a thorough understanding of the invention to a person skilled in the art. It will be understood, however, that the invention may be practiced without one or more of the particulars described. It will also be understood that the principles of the invention have application to wood pulp sources as well as non-wood pulp sources such as bagasse, reeds, straw, and the like. In other instances, well known elements have not been shown or described in detail to fully illustrate the present invention. Accordingly, the specification and drawings are to be regarded in an illustrative, rather than a restrictive, sense. As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An intelligent control process which utilizes accurate and real time measurement of moisture content and species of wood chips on-line in a pulping process comprising:
   (a) conveying wood chips from a wood chip storage facility to a digester;
   (b) scanning the wood chips as they are conveyed to determine their species and moisture content by heating the wood chips to a temperature between 220° C. to 350° C. and using an ion mobility spectrometer to sense the moisture content and characterize the species of the wood chips by species signatures;
   (c) transmitting the moisture content and wood species signature data from the ion mobility spectrometer to a programmed distributed control system which adjusts rate of steam and chemical supply to the digester to minimize steam and chemical use and optimize digestion time of the wood chips; and
   (d) regulating steam flow and chemicals supplied to the digester according to the moisture content and the characterization of the wood species as dictated by the programmed distributed control system.

2. A process as claimed in claim 1 wherein the rate of conveyance of the wood chips from the storage facility to the digester is controlled by a wood chip rate control mechanism.

3. A process as claimed in claim 1 wherein the wood chips are heated with a laser beam.

4. A process as claimed in claim 1 wherein representative samples of wood chips are periodically removed from the wood chips being conveyed to the digester for analysis by the ion mobility spectrometer.

5. A process as claimed in claim 4 wherein the samples of wood chips are periodically removed by a robotic arm.

6. A process as claimed in claim 1 wherein the distributed control system continuously monitors and adjusts process targets to optimize wood species control.

7. A process as claimed in claim 6 wherein optimal chip sampling sites are determined for utilizing the moisture content and species data obtained by the ion mobility spectrometer in real time mode.

8. A process as claimed in claim 1 wherein the data obtained from the ion mobility spectrometer is transmitted to a control system which adjusts wood chip reclaim speed to regulate chip species control.

9. A process as claimed in claim 1 wherein the characterization of the wood chip species is used to regulate wood chip storage facilities.

10. A process as claimed in claim 1 wherein a non-wood is used for pulping.

11. A process as claimed in claim 1 wherein the non-wood is bagasse, reed or straw.

12. A process according to claim 1 wherein moisture content and species of wood chips are determined in real time by removing a representative wood chip sample from the conveyed wood chips, heating the wood chip sample with a laser to a temperature of between about 220° C. to 350° C. to produce trace vapors from the wood chip sample; ionizing the trace vapors, measuring the time of arrival of the ionized vapors at a collector electrode, producing an electrical data signature representative of the moisture content in the conveyed wood chips and transmitting the electrical data signal to the programmed distributed control system, the programmed distributed control system regulating wood chip feed rate according to a first predetermined set point, regulating liquor to wood ratio in the digester according to a second predetermined set point, and regulating active alkali to dry wood ratio in the digester according to a third predetermined set point.

13. A process of determining accurate and real time moisture content in species of wood chips on-line in a pulping process comprising:

(a) conveying wood chips from a wood chip storage facility to a digester;

(b) controlling the rate of conveyance of the wood chips from the storage facility to the digester by a wood chip rate control mechanism;

(c) scanning the wood chips as they are conveyed to determine their species and moisture content by heating the wood chips with a laser to a temperature between about 220° C. 350° C. and using an ion mobility spectrometer to sense the moisture content and characterize the species of the wood chips by species signatures;

(d) transmitting the moisture content and species signature data from the ion mobility spectrometer to a programmed distributed control system, said programmed distribution control system continuously in real time monitoring and adjusting process targets to optimize wood species control; and (e) regulating by means of the programmed distributed control system rate of steam flow and amount of chemicals supplied to the digester as commanded by the programmed distributed control, system based on moisture content and wood species signature data obtained from the ion mobility spectrometer.

* * * * *